United States Patent [19]

Plahmer

[11] Patent Number: 4,658,638
[45] Date of Patent: Apr. 21, 1987

[54] MACHINE COMPONENT DIAGNOSTIC SYSTEM

[75] Inventor: Thomas G. Plahmer, Waukesha, Wis.

[73] Assignee: Rexnord Inc., Brookfield, Wis.

[21] Appl. No.: 882,324

[22] Filed: Jul. 7, 1986

Related U.S. Application Data

[63] Continuation-in-part of Ser. No. 721,097, Apr. 8, 1985, Pat. No. 4,620,185.

[51] Int. Cl.[4] .................................................. G01N 3/56
[52] U.S. Cl. ............................................. 73/7; 73/64; 340/682; 436/7
[58] Field of Search .................. 73/64, 7, 10; 340/682, 340/679; 436/7

[56] References Cited

U.S. PATENT DOCUMENTS

| | | | |
|---|---|---|---|
| 3,428,838 | 2/1969 | Carson et al. | 436/7 X |
| 3,526,127 | 1/1970 | Sarkis | 73/64 |
| 4,000,656 | 1/1977 | Moioli | 73/64 X |
| 4,364,032 | 12/1982 | Narato et al. | 340/679 |

FOREIGN PATENT DOCUMENTS

| | | | |
|---|---|---|---|
| 2156011 | 10/1985 | United Kingdom | 73/7 |
| 905728 | 2/1985 | U.S.S.R. | 73/7 |

Primary Examiner—Stewart J. Levy
Assistant Examiner—Joseph W. Roskos
Attorney, Agent, or Firm—Lawrence J. Crain

[57] ABSTRACT

A machine condition diagnostic system is provided wherein machine components or their immediate surroundings are labelled with indicator materials. A normal level of indicators in the lubricant will be established. The lubricant is monitored and periodically sampled to determine the presence of abnormal levels in the amount of indicator material. Since each component or components performing a similar function will be labelled with the same indicator, the presence of a particular indicator in abnormal amounts in the lubricant will direct the machine operator to the precise location requiring repair or replacement.

14 Claims, 6 Drawing Figures

MACHINE COMPONENT DIAGNOSTIC SYSTEM

This is a continuation-in-part of application Ser. No. 721,097, filed Apr. 8, 1985, now U.S. Pat. No. 4,620,185.

BACKGROUND OF THE INVENTION

The present invention relates to a system for monitoring the vital signs of heavy machines, and specifically relates to a system for monitoring the level of indicator materials in a circulating fluid to pinpoint the location of malfunctioning machine components.

The maintenance of machinery, especially heavy industrial equipment, has traditionally been an expensive and time consuming operation. Modern production schedules often require these machines to be in operation for extended periods of time, and often continuous operation is required. Consequently, preventive machine maintenance has evolved from a process practiced only by the more progressive machine operators, to a requirement of all profit minded operators.

An example of how preventive machine maintenance can affect the economics of machine operation is found in the process machinery industry, which provides heavy duty machines such as rock crushers used in mining and road building.

Bearing failure is a major cause of rock crusher breakdown, and is also a major source of maintenance expenditures in this industry. It normally takes from 50 to 100 man hours to dismantle a rock crusher in order to change worn bearings, each of which may be very costly. In an effort to minimize maintenance costs due to malfunctioning bearings, manufacturers have developed methods of monitoring the bearing condition to predict and minimize machine breakdowns due to bearing failure.

There are several indicia of machine condition which can be monitored to predict and prevent bearing failure. The following examples will be provided in the context of a rock crusher, however, the same principles can be used for most types of machinery. For machines having an internal bearing lubrication system, means have been developed to measure lubricant temperature in various parts of the machine to detect differences in lubricant temperature which indicate excessive friction. If the temperature differential exceeds a pre-set threshold, some kind of alarm signal will be triggered. Similarly, lubricating or hydraulic oil pressure can be monitored to detect machine malfunctions by activating an alarm if oil pressure falls below a pre-set figure. Machine vital signs can further be monitored by the use of a sensing device which measures the revolutions per minute of various moving parts to ensure that shaft speed is maintained within desired limits. A slow moving shaft may indicate excess friction caused by a worn bearing. Sensing devices have also been developed to measure electric motor power draw and the level of lubrication oil in a holding tank. These sensing systems can be either manually or automatically monitored.

A major drawback of the above-mentioned sensing systems is that although machine failure can be detected and prevented, it has previously been impossible to ascertain the exact location of the malfunctioning component. Thus, when any or all of the above-mentioned sensing devices become activated, normally large portions of the affected machine must be dismantled to discover and repair or replace malfunctioning machine components.

Consequently, there is a definite need for a machine maintenance system which is capable of both monitoring machine condition and pinpointing the exact location of the malfunctioning element.

It is therefore a major objective of the present invention to provide a machine condition diagnostic system which is capable of monitoring a circulating fluid over extended periods of time to detect instances of excessive component wear, as well as being able to pinpoint the exact location of an existing or pending malfunction so that maintenance can be accomplished in much shorter periods of time while incurring lower costs.

SUMMARY OF THE INVENTION

The present invention discloses a machine condition diagnostic system for use in a machine having a circulating fluid system, consisting of a fluid monitor used in conjunction with machine components which are labelled with function-specific wear indicators. A typical monitored component would be a single lubricated bearing. Alternatively, a plurality of bearings involved with a particular machine function, for example, drive shaft box bearings, would be labelled with the same indicator so that the presence of that indicator in the lubricant in abnormal amounts would indicate a malfunction in the bearings of that particular section of the machine. All replacement bearings would contain the same indicator to assure continuity of the system.

The machine condition diagnostic system of the present invention comprises uniformly distributing a distinctive trace element within selected wearing or closely adjacent non-wearing components so that the component or components performing a specific function all have the same indicator; establishing normal levels of indicators in the lubricant; and monitoring the lubricant on a periodic or continuous basis to detect increases in the indicator level. If the level of indicators does in fact exceed normal levels, a sample of the lubricant is analyzed by methods capable of ascertaining the identity of the indicator and the location of the malfunctioning component.

Thus, the machine condition diagnostic system of the present invention enables machine operators to continually monitor machine condition and accurately locate malfunctioning components in order to more efficiently maintain machine operation.

BRIEF DESCRIPTION OF THE DRAWINGS

The invention and its many attendant objects and advantages will become better understood by reference to the following detailed description of the preferred embodiment when read in conjunction with the following drawings, wherein.

DESCRIPTION OF THE PREFERRED EMBODIMENT

Figure 1:
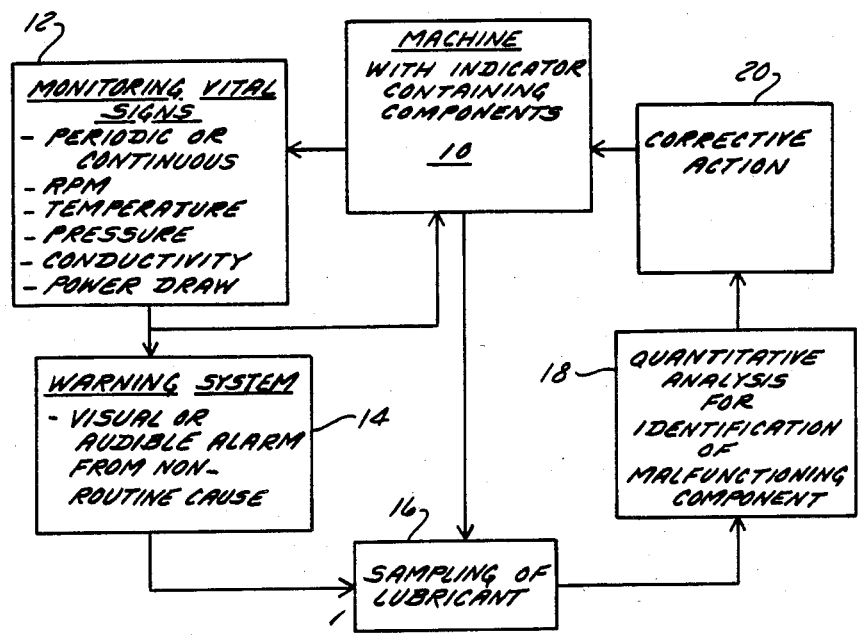
FIG. 1 is a schematic illustration of the machine condition diagnostic system of the present invention.
Figure 3:
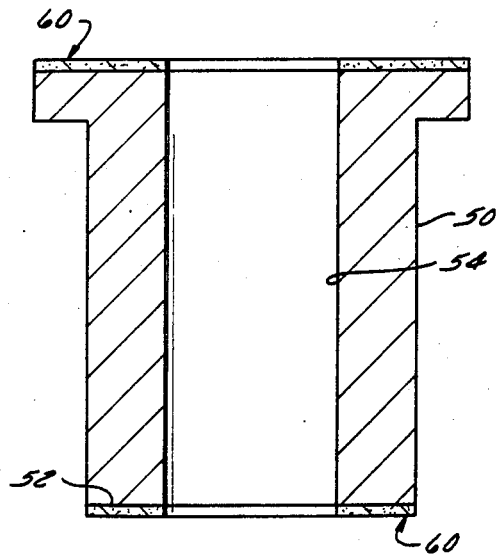
FIG. 3 is a sectional elevation of a sleeve bearing or bushing from a machine embodying the present invention wherein the machine condition indicator is distributed on the ends, in non-wear areas of the bearing.

Referring now to FIG. 1, a machine bearing condition diagnostic system is shown comprising a machine 10 having a circulating fluid system, such as an internal lubrication or cooling system, and a machine condition monitoring system 12 which is capable of either periodically or continually monitoring machine vital signs such as component RPM, oil temperature, oil pressure, oil level in the oil holding tank, power draw and the time that various machine components continue moving after power to the machine has been cut off.

The machine 10 to be monitored ideally contains components such as bearings, shafts, seals, pistons, and/or cylinders which are expected to wear. Any or all of these components may be provided with function-specific wear indicators 60. Wear indicators 60 may be any traceable element or compound, including radioactive indicators. The indicator material 60 may be distributed anywhere within, on or in close proximity to, the wearing component. Regardless of its location, the indicator must be in direct contact with the circulating fluid. Examples of circulating fluids are lubricating oil, water and hydraulic fluid. A significant feature of the present invention is the capability of using non-wearing components as indicator sites for adjacent wearing components.

Malfunctioning or failing bearing and wear components normally generate some increase in machine temperature, and this increase is most pronounced in the area immediately surrounding a particular component. To capitalize upon this relationship, the present invention utilizes tracer element materials 60 which are temperature sensitive to some degree. This may be accomplished by encapsulating the indicator 60 within waxes or other carriers having a range of melting points. The extraneous heat generated by malfunctioning components will cause deterioration of the tracer element carrier contained in, on, or in close proximity thereto, so that the tracer is then released into the fluid system and will be subject to monitoring. Due to the tendency of the circulating fluid to rapidly quench and dissipate any generated heat, it is important that labelled non-wearing components be located as close as possible to the wearing component to be monitored.

Figure 5:
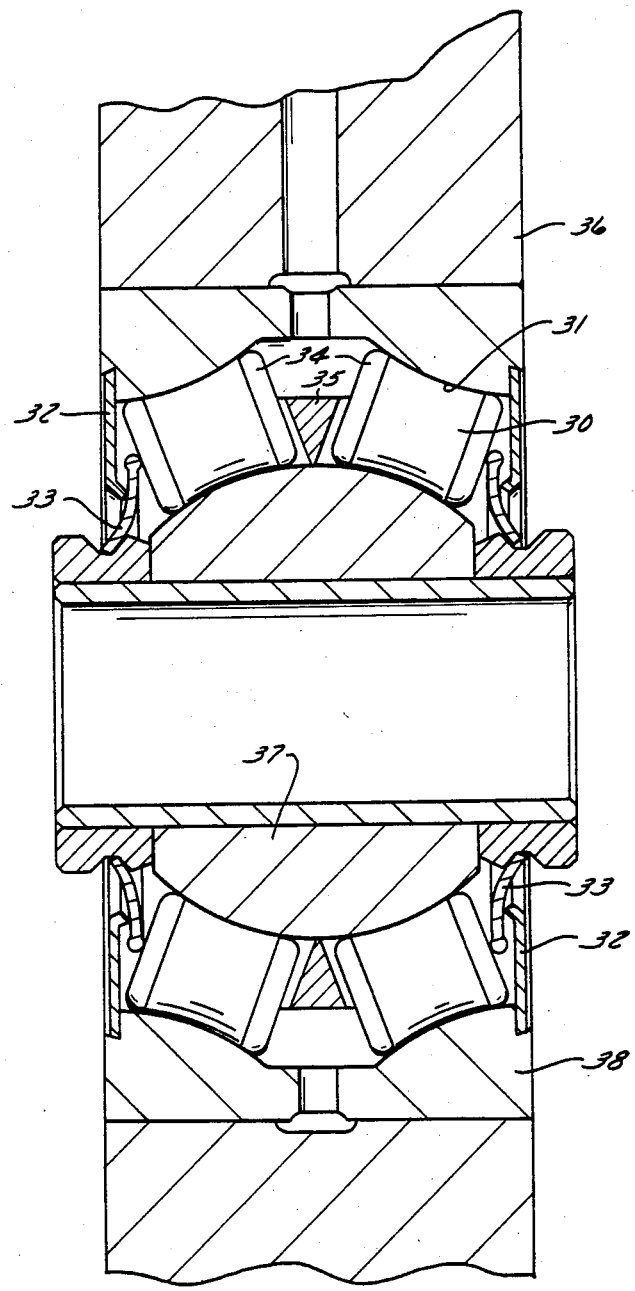
FIG. 5 is a sectional elevation of a rolling element bearing, wherein various non-wearing locations for indicator placement are designated.

Within each class of monitored components, the tracer element may be placed in various parts of the component, regardless of whether or not those parts experience wear. For example, referring to FIG. 5, in the case of a rolling element bearing, the greatest wear occurs between the contacting surfaces 31 of the rolling elements 30 and the inner and outer races 37 and 38, respectively. If such a bearing is labelled in accordance with the present invention, the tracer element may be contained within or upon the cage 35, seals 33, shields 32, roller ends 34, inner or outer races 37 and 38, or any component such as housing 36 in close proximity to the monitored bearing. A critical consideration is that the labelled component or part thereof must be exposed to the circulating fluid.

Since many machine components are fabricated from multi-element alloys, it may be difficult to totally exclude a particular trace element from components which have another trace element as their indicator. Nonetheless, those components used in machines utilizing the present system will be fabricated in such a way as to minimize the presence of unwanted trace elements.

During normal use, a certain amount of indicator may be present in the circulating fluid. The alarm component 14 of the present invention is designed to be triggered by unacceptable variations in the amount of indicator present in the circulating fluid.

Figure 4:
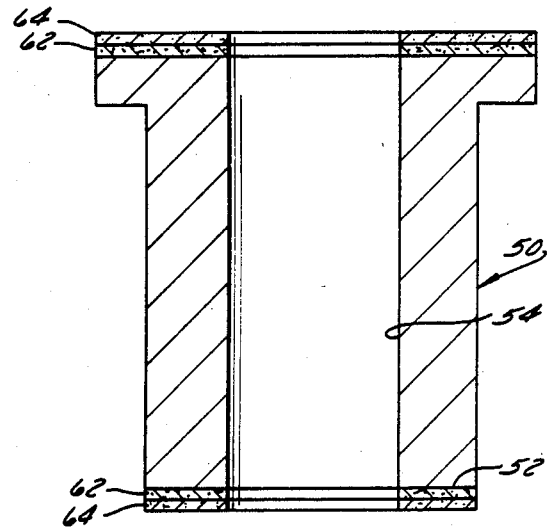
FIG. 4 is a sectional elevation of a bearing from a machine embodying the present invention wherein the machine condition indicator is comprised of multiple indicators applied to non-wear areas of the bearing.
Figure 4A:
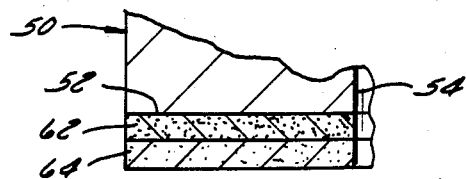
FIG. 4a is an enlarged sectional elevation of a multilayered indicator as depicted in FIG. 4.

In some cases, more than one indicator may be desired for a component. For example, the highest acceptable machine operating temperature, and the designed bearing failure temperature may need to be separately labelled. In these situations, indicators may be applied in layers, as shown in FIGS. 4 and 4a. Normally, the higher temperature indicator 62 will be located closer to the labelled component 50 than will the lower temperature indicator 64. In this case, component 50 would be wearing, but would be labelled on a non-wearing surface 52 located adjacent to wearing surface 50. Thus, as temperatures in the immediate vicinity of the wearable surface 54 increase, lower temperature indicator 64 will be released first to warn of increased wear and the existence of a potential problem. Should the condition of component 50 deteriorate further and temperatures increase, high temperature indicator 62 would be released into the fluid. Depending on the application, multiple indicators such as 62 and 64 could be placed separately, with one or more indicators on a wearing component, and others located on adjacent non-wearing components.

Figure 2:
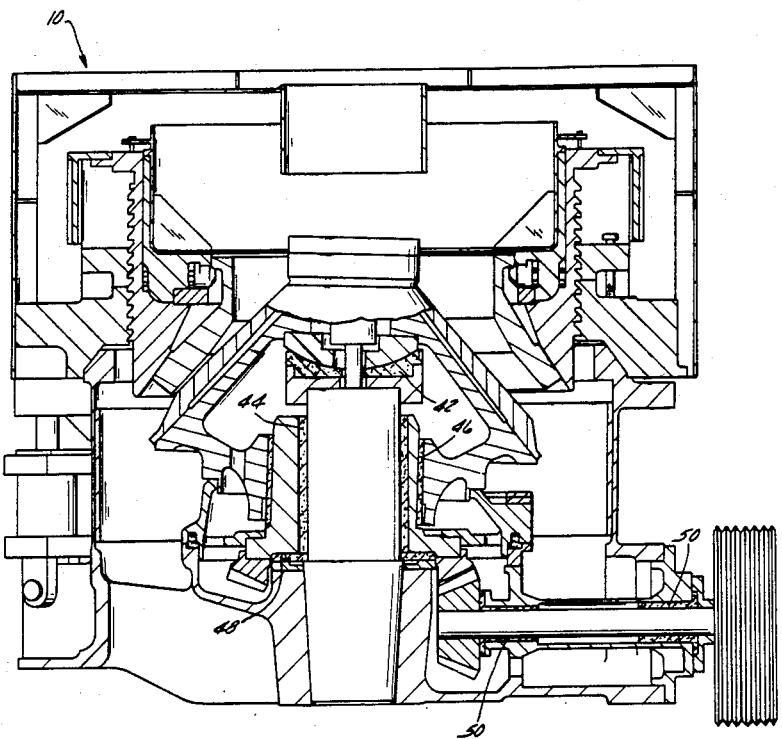
FIG. 2 is a sectional elevation of a rock crusher, indicating the various locations where function-specific trace elements would be placed.

Referring to FIG. 2, a rock crusher 10 embodying the present invention would have distinct indicator elements distributed in a function-specific arrangement. For example, the socket liner 42 would be labelled with beryllium as its indicator, head bushing 44 with bismuth, eccentric bushing 46 with cobalt, and thrustplate bearing 48 with zirconium.

Alternatively, distinct indicator elements could be assigned to designated classes of components, such as labelling all countershaft bearings 50 with chromium. Replacement bearings would contain the same indicator materials to assure continuity of the system.

All of the above-mentioned monitored machine functions such as oil pressure and temperature, shaft RPM, power draw or dielectric constant have pre-set acceptable parameters within which the machine normally operates. If any of the monitors detect an unacceptable variation in any of the pre-set parameters, the system is designed to alert the operator by means of an alarm 14 in the form of a written printout, an audible signal such as a bell, or a flashing light.

The present system can also be used with existing devices capable of sensing a change in the dielectric constant of the lubricant, in this case lubricating oil. This dielectric analysis is applicable to the present invention because it provides the capability of sensing the presence of location-specific metallic trace elements in the lubricating oil. As the level of metallic particles carried in the oil varies, the conductivity changes. This change in conductivity is measured and compared with a predetermined value.

When conductivity values indicate a level of metallic tracer particles which deviates from the preset level, an alarm 14 is triggered. In the case of the other monitored machine vital signs 12, an unacceptable variation in any one function triggers either the same alarm or a function-specific alarm which indicates the presence of an imminent malfunction.

In conventional systems, once the alarm is triggered, the operator only knows that a malfunction has been detected. In the present invention, once alarm 14 is triggered and a bearing failure is suspected, the operator removes a sample of the fluid 16. The amount of fluid in the sample will vary from machine to machine; however, anywhere from one pint to one quart should be acceptable. In the case of machines not fitted with automatic vital sign monitoring systems 12, fluid can still be sampled on a periodic basis as a preventive measure.

The sample then undergoes analysis, 18 such as by spectrochemical means, to determine the identity of various contaminants contained therein. The type of analytical method will vary with the individual characteristics of the various indicator elements. The analysis will reveal the presence of excessive amounts of trace elements corresponding to one or more locations in the machine where excessive component wear is occurring. The operator merely has to coordinate the material found in the analysis with the functional section of the machine associated with that particular indicator. Appropriate repair and/or replacement of malfunctioning parts 20 can then be readily accomplished, in many instances avoiding catastrophic failure and minimizing downtime and failure cost.

When the system of the present invention is in place, malfunctioning components are located in the following manner. In the event that any one or a combination of the monitored machine vital signs such as oil pressure or temperature, shaft RPM, power draw or lubricant dielectric constant indicate an abnormal rate of wear, the appropriate alarm will be activated.

If normal alarm causes are eliminated, a sample of fluid will be analyzed via spectrochemical or other means. The results of the analysis will identify and quantify the various indicator contaminants. Those indicators whose levels deviate from predetermined values will be noted and correlated with their corresponding machine function to identify the malfunctioning component or components.

Thus, the present invention provides a machine condition diagnostic system which is capable of monitoring the condition of circulating fluid and pinpointing malfunctioning components so that machine down time is minimized and repairs are accomplished more efficiently. While a particular embodiment of this process has been described, it will be obvious to persons skilled in the art that changes and modifications might be made without departing from the invention in its broader aspects. It is the aim of the dependent claims to cover all such changes and modifications as fall within the true scope and spirit of the invention.

What is claimed is:

1. In a system for monitoring a machine having an internal circulating fluid and various replaceable, wearable components, such that the fluid is common to said wearable components, the process of monitoring the condition of circulating fluid to pinpoint malfunctioning components comprising:
    (a) distributing a distinct trace element indicator material in close proximity to each wearable component;
    (b) establishing acceptable cumulative levels of indicators from all wearable components in said fluid;
    (c) sampling said fluid; and
    (d) analyzing said sample of said fluid by means capable of distinguishing between various indicators to detect the presence and changes in the amount of the particular indicator or indicators which signify a specific malfunctioning component.

2. The machine condition diagnostic process described in claim 1, wherein said trace element indicator is heat-sensitive.

3. The machine condition diagnostic system described in claim 1, further including distributing said indicator on a non-wearable component.

4. The machine condition diagnostic process defined in claim 1, wherein said indicator-bearing components are bearings.

5. The machine condition diagnostic process defined in claim 1, further including distributing a distinct indicator to identify a function-specific class of components.

6. The machine condition diagnostic process defined in claim 1, further including analyzing said sample of fluid by spectrochemical means.

7. The machine condition diagnostic process defined in claim 1, wherein said circulating fluid is hydraulic fluid.

8. The process of monitoring the condition of machine lubricant to pinpoint malfunctioning wearing components comprising:
    (a) uniformly distributing at least one distinct temperature-specific trace element indicator material in close proximity to each type of component, so that the component or components performing a specific function such as main shaft bearings, all have the same indicator;
    (b) establishing acceptable levels of said trace elements in the machine lubricant;
    (c) monitoring said bearing lubricant for an unacceptable change in the level of contaminants;
    (d) demonstrating said unacceptable change by warning means;
    (e) sampling said lubricant; and
    (f) analyzing said samples of said lubricant by spectrochemical analysis or other means capable of detecting the presence of the particular indicator or indicators which signify a specific malfunctioning bearing or bearings.

9. The machine condition diagnostic process defined in claim 8, wherein the machine lubricant is hydraulic fluid.

10. The machine condition diagnostic process defined in claim 8, further including providing each of said components with multiple indicator materials located directly adjacent to each other.

11. The machine condition diagnostic process defined in claim 10, wherein each of said different indicator materials has a distinct and distinguishable melting point.

12. The machine condition diagnostic process defined in claim 10, wherein said indicator materials are laminated to each other.

13. The machine condition diagnostic process defined in claim 12, wherein said laminated indicators are stacked in order of increasing temperature sensitivity.

14. The machine condition diagnostic process defined in claim 8 further including distributing said indicator on a non-wearable component.

* * * * *